United States Patent [19] [11] 3,813,933
Weiss et al. [45] June 4, 1974

[54] DYNAMIC TORQUE INDICATORS

[75] Inventors: Lowell Warner Weiss; Clendon Hart Fitzgerald, both of Denver, Colo.

[73] Assignee: B. K. Sweeney Manufacturing Co., Denver, Colo.

[22] Filed: Feb. 2, 1972

[21] Appl. No.: 222,957

[52] U.S. Cl. .............................. 73/136 A, 73/139
[51] Int. Cl. ............................................. G01l 5/10
[58] Field of Search.... 73/DIG. 4, 1 C, 70.1, 136 A, 73/139

[56] References Cited
UNITED STATES PATENTS
2,409,876  10/1946  Martin et al. ............... 73/136 A X
2,601,259  6/1952  Busignies ....................... 73/136 A
2,915,896  12/1959  Booth, Jr. et al. ............... 73/70.1
3,269,175  8/1966  Sprosty ......................... 73/DIG. 4

FOREIGN PATENTS OR APPLICATIONS
862,462  3/1961  Great Britain ................... 73/136 A Primary Examiner—Charles A. Ruehl
Attorney, Agent, or Firm—Burton, Crandell & Polumbus

[57] ABSTRACT

The present invention is a dynamic torque indicator for wrench systems. A rotor, carried within a rather short cylindrical housing has a driven socket connector projecting from one end of the housing and a driving socket stub projecting from the other end of the housing. The housing includes a radially extended arm from whence a conductor cable extends, as to a readout meter calibrated to indicate torque.

A transducer is positioned within the medial portion of the rotor to convert the torque applied to the rotor to an electrical signal. The transducer consists of piezo-electric crystals mounted between opposing arms upon the rotor. The piezo-electric crystals are connected to one element of a rotary capacitor consisting of a first axially centered cylinder embracing the rotor and a second like cylinder embracing the first cylinder. An amplifier, carried in the housing arm controls the strength of the electrical signal to provide an amplified signal of suitable strength at the readout meter.

Thus, when the dynamic torque indicator is interposed between a driven component and a drive component, torque will be applied to the rotor and this torque will be indicated directly upon the readout meter.

8 Claims, 11 Drawing Figures

PATENTED JUN 4 1974

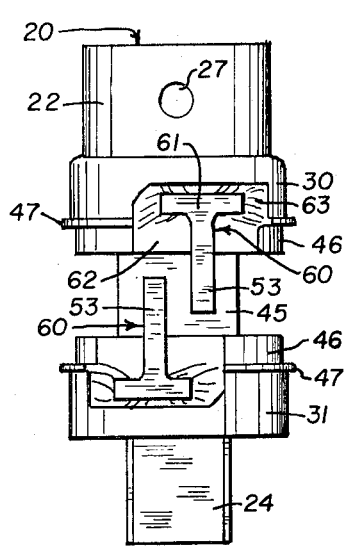
Fig. 8
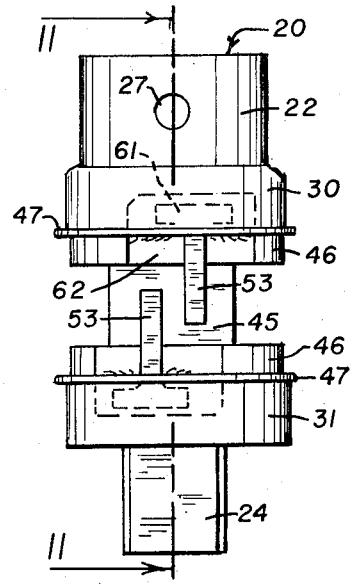
Fig. 9
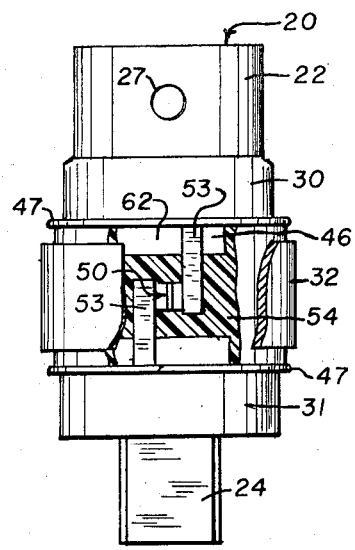
Fig. 10
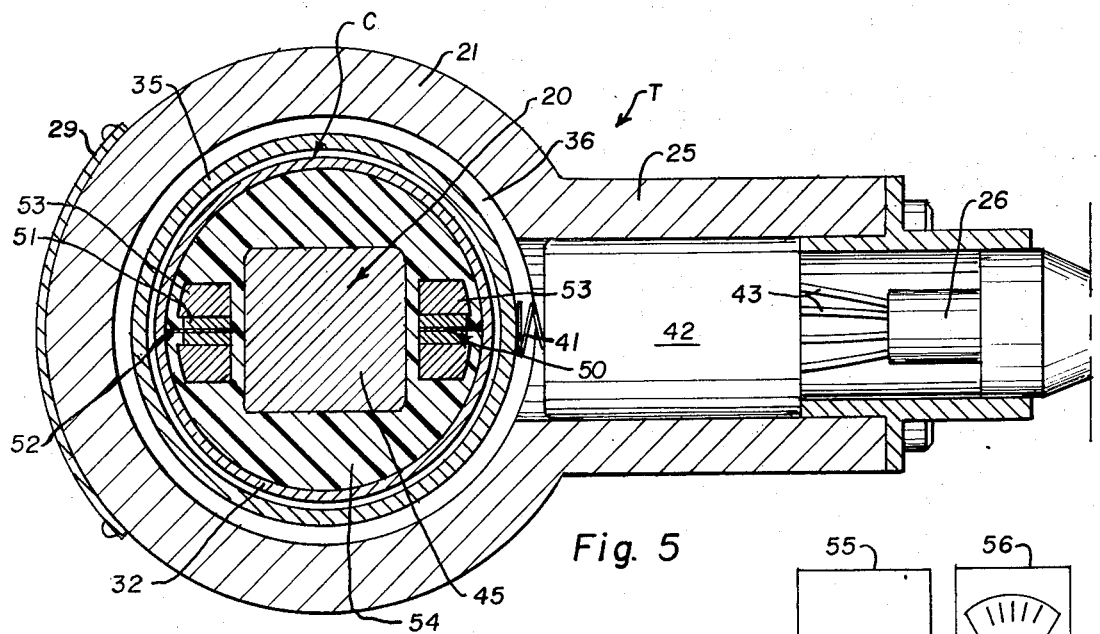
Fig. 5
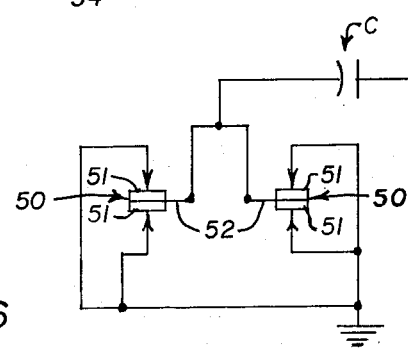
Fig. 6
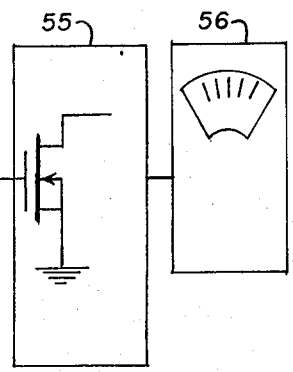

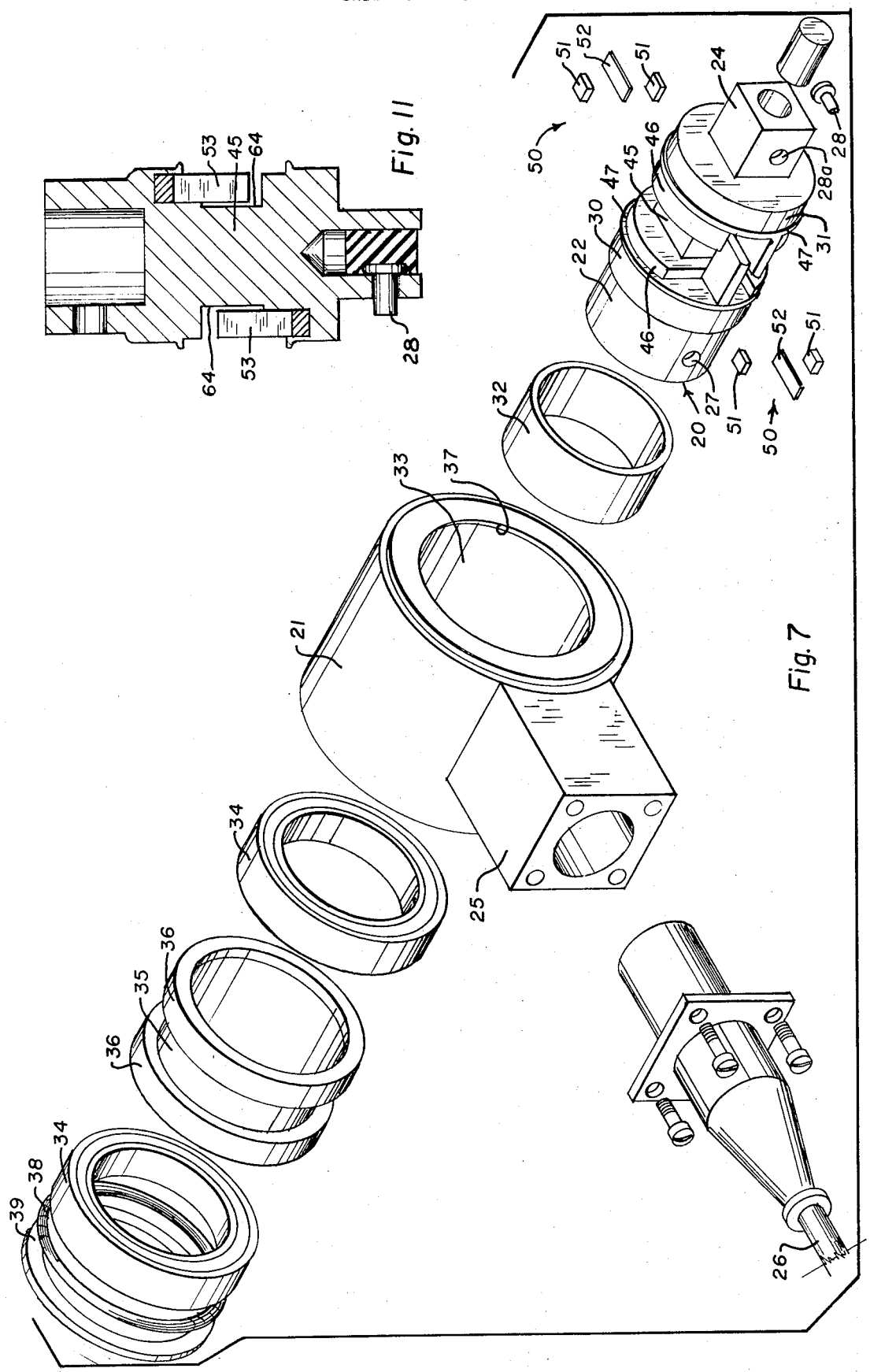

3,813,933

DYNAMIC TORQUE INDICATORS

The present invention relates to apparatus for measuring and monitoring torque, as between driving and driven elements, and more particularly, to apparatus for measuring and monitoring the dynamic torque exerted by a rotary type of wrench. Accordingly, the invention will be hereinafter referred to as a "dynamic torque indicator for a rotary wrench" and sometimes simply as a "torque indicator".

A primary object of the invention is to provide a novel, improved and simplified torque indicator for accurately and minutely measuring the dynamic torque imparted upon a work piece by a rotary type of wrench.

Another object of the invention is to provide a novel and improved dynamic torque indicator for a rotary wrench which will include a rotor mounted in a housing, so that the rotor will rotate freely in the housing and be connected between driving and driven elements, so that the torque applied by the driving element will be applied to the rotor and transmitted thence to the driven element.

Another object of the invention is to provide in such a dynamic torque indicator, a transducer mounted upon a torque transmitting rotor to accurately and minutely measure torque directly as an electrical signal.

Another object of the invention is to provide a novel and improved dynamic torque indicator for a rotary wrench, wherein a signal producing transducer upon the rotor is electrically, but not physically, connected to pickup circuits in a housing carrying the rotor, by the use of a cylindrical capacitor between the rotor and the housing, whereby electrical signals of the transducer are transmitted while the rotor is rotating.

Yet other objects of the invention are to provide a novel and improved dynamic torque indicator for a rotary wrench which is simple, compact, accurate, easy to use and calibrate, versatile in application, and is rugged and durable and especially capable of being used under severe conditions, such as with impact wrenches.

With the foregoing and other objects in view, all of which more fully hereinafter appear, our invention comprises certain constructions, combinations and arrangements of parts and elements as hereinafter described, defined in the appended claims and illustrated in preferred embodiment in the accompanying drawings, in which:

FIG. 5 is a sectional view as taken from the indicated line 5—5 of FIG. 4.

FIG. 6 is a circuit diagram of the torque indicator, but showing amplifier and readout components as block diagrams.

FIG. 7 is an exploded view showing the individual components making up the torque indicator.

FIGS. 8, 9 and 10 are elevational views of the rotary head per se, indicating one manner in which the head may be constructed.

FIG. 11 is a sectional view taken from the indicated line 11—11 of FIG. 9.

Figure 1:
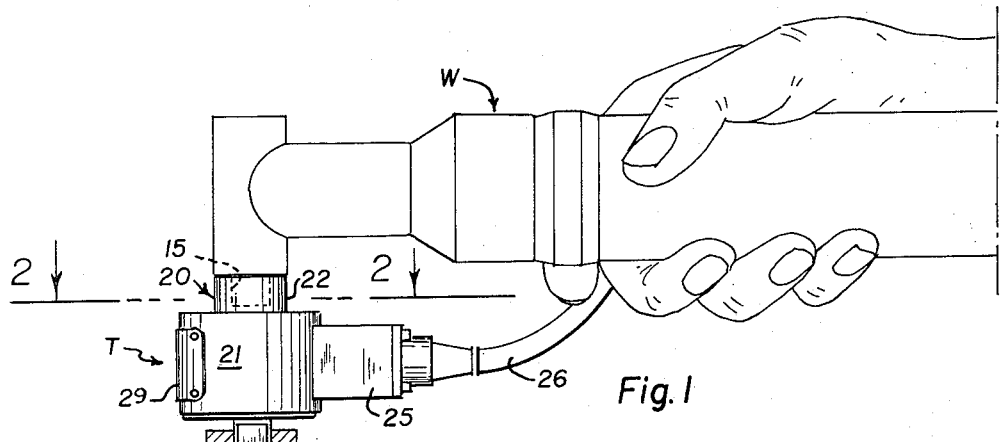
FIG. 1 is a side view showing a fragment of a rotary wrench, the hand of an individual holding the wrench, and with the improved torque indicator mounted on the rotary head of the wrench socket, with the socket being shown in section.

Referring more particularly to the drawing, FIG. 1 illustrates the manner in which the torque indicator "T" may be used with a rotary wrench "W" and a nut socket "S". The rotary wrench and nut sockets are exemplary of any driving and driven components wherein torque is involved. The wrench "W" is of any conventional type, such as an impact wrench or a nut runner. Such a wrench has a drive shaft in the form of a square stub 15 which is ordinarily fitted into a mating opening in the top of a typical nut socket "S".

The torque indicator "T" contains a rotor 20 carried within a cylindrical housing 21. Each end of the rotor 20 projects a short distance from the housing cylinder and one end, hereinafter referred to as the "top" end, is formed as a cylindrical head 22, having an axially aligned square opening 23 to receive the driving stub 15 of the rotary wrench "W". The other end of the rotor, hereinafter referred to as the "bottom", projects from the housing as a square stub 24 similarly to the stub 15 of the rotary wrench "W" to receive the nut socket "S". To hold the torque indicator upon a wrench stub 15, a side hole 27 is formed in the head 22 to receive a conventional ball or finger on the wrench stub. A finger 28 is mounted in a suitable side hole 28a in the stub 24 to hold the nut socket "S" upon the stub, all in a conventional manner which need not be further described. A short, hollow arm 25 extends laterally from the housing 21 of the torque indicator to carry circuit amplifier components within it, as will be hereinafter described. A cable 26 extends from the end of the arm to a readout meter, not shown. To complete this overall arrangement, a suitable nameplate 29 may be secured to the housing 21 as shown.

Figure 4:
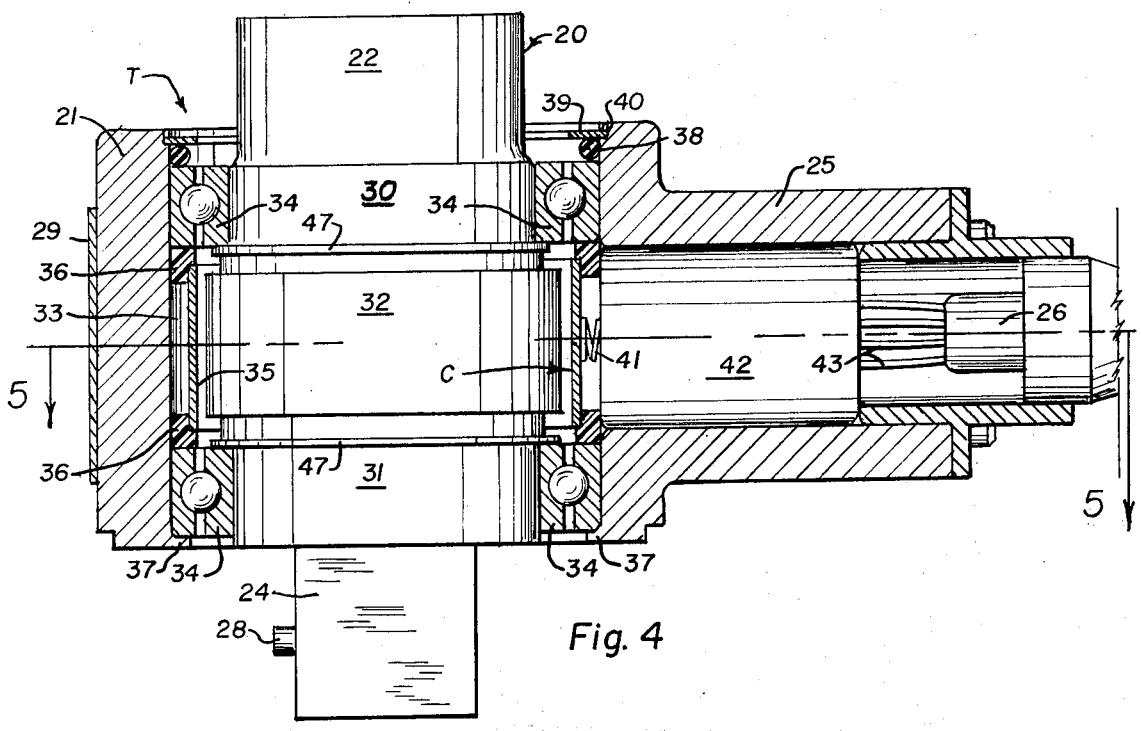
FIG. 4 is a longitudinal sectional view, taken substantially on the indicated line 4—4 of FIG. 2, but with the rotary head being shown in full.

The general form of the rotor 20 and its arrangment within the housing 21 is illustrated in FIG. 4. The rotor, axially extended through this housing, is formed as a high strength, tempered steel member having an array of segments along its reach including the cylindrical head 22 at one end, and the stub 24 at the opposite end. A cylindrical bearing seat 30 is formed adjacent to the head 22 at one end of the rotor and a second bearing seat 31 is formed adjacent to the stub 24 at the opposite end of the rotor. The central segment of this rotor, between the bearing seats 30 and 31, carries transducer components as hereinafter described. These transducer components are enclosed within an axially-centered, cylindrical shell 32 which forms the rotating plate of a rotary capacitor "C", the shell being suitably insulated from the body of the rotor by a dielectric case as hereinafter described.

Figure 2:
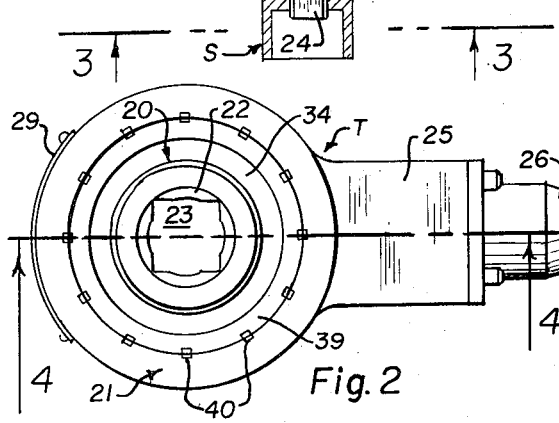
FIG. 2 is a plan view of the torque indicator per se, as taken substantially from the indicated line 2—2 of FIG. 1, but on an enlarged scale.
Figure 3:
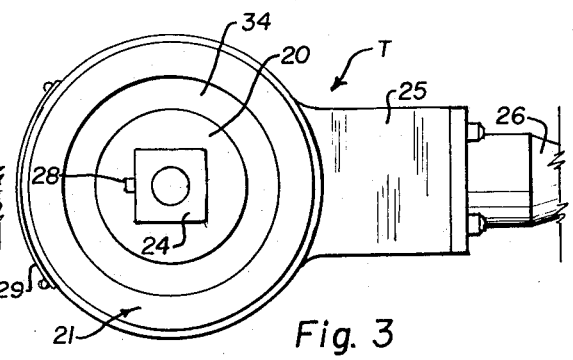
FIG. 3 is a plan view of the opposite side of the torque indicator, as taken from the indicated line 3—3 of FIG. 1, but on an enlarged scale.

A cylindrical passageway 33 in the housing 21 has a diameter to snugly receive and retain a ball bearing race 34 at each end of the housing passageway, with each race being fitted onto the cylindrical bearing seats 30 and 31 of the rotor to be securely held by the rotor. The central portion of the housing 21, between the bearing races 34, encloses the central segment of the rotor. A metallic, axially-concentric cylindrical shell 35 is mounted in the central portion of the housing passageway within rabbeted shoulders of insulating spacer rings 36 which maintain the shell concentric of and between the two bearing races. These rings 36 are of a dielectric material to insulate the shell 35 from the body of the housing. To retain these members, the bottom of the housing passageway 33 has an inwardly extending shoulder 37 and the bottom bearing race 34 is abutted against this shoulder. A resilient O-ring 38 is abutted against the top of the other bearing race 34, at the top of the housing passageway and is held in place by a lock ring 39 fitted in the housing passageway adjacent to the top of the passageway and snugly secured in position by stakings 40 as indicated in FIG. 2.

The shell 35 in the housing embraces the shell 32 of the rotor with a slight gap therebetween and this outer shell 35 thus constitutes the stationary plate of the rotary capacitor "C" above mentioned. It follows that the transducers enclosed within the rotor shell 32, which convert torque strain to an electrical voltage, can transmit the voltage signal from the rotor to an amplifier component in the arm 25 of the stationary housing through a circuit having a ground which includes the rotor, the bearings and the housing. The other leg of the circuit extends from the transducer through The rotary capacitor "C", and thence to amplifier components in the arm 25. A spring 41 extends from the stationary capacitor shell 35 to amplifier components formed within a snugly fitting package 42 within the arm 25. Leads 43 in the cable 26 connect the amplifier components in the package 42 and extend from thence to a suitable readout meter.

The central segment of the rotor is formed as a flexure column 45 which is illustrated as being square in section and being substantially the same size as the stub 24. This flexure column is positioned between narrow, enlarged-diameter, cylindrical heads 46 and each head 46 is positioned adjacent to and merges with a respective bearing seat 30 or 31. The heads 46 are slightly smaller in diameter than the bearing seats 30 and 31. Thus, shoulders 47 lie between the head and the bearing seats 30 and 31 to abut against the bearing races 34 to hold the rotor in position between the bearing races and within the passageway 33 of the housing 21.

The flexure column 45, although comparatively short and stubby and apparently rigid, is sufficiently elastic as to produce a minute, but measurable, differential to the torque imposed upon the rotor and thus, an important feature of the present invention lies in the selection and arrangement of a transducer at the central section of the rotor which can respond to the torque and resulting flexure upon the rotor to produce a measurable signal, proportional to the torque.

Piezo-electric crystals were found to be suitable for this purpose since they may be provided as small wafers which produce a voltage when subjected to pressure. A preferred arrangement provides for two crystal sets 50 arranged between the heads 46, alongside and at opposite sides of the flexure column 45. Each crystal set 50 includes a pair of X-cut quartz crystals formed as small wafers 51 oriented in opposition to each other to provide polarized vector directions toward each other. A brass shim 52 is placed between each opposed pair of crystals and a portion of this shim extends from the adjacent crystals to connect with the shell 32 of the rotary capacitor, as shown in FIG. 5.

Each crystal set 50 is mounted between a pair of comparatively-heavy, flat opposing arms 53. One arm extends from the inner face of one head 46 to lie alongside the flexure column while the other arm extends from the inner face of the other head 46 to parallel the first, and with parallel opposing sides of the arms being at a spacing which will receive the crystal set 50. The arms are arranged so as to arcuately move together responsive to a clockwise torque on the rotor so as to exert pressure on the piezo-electric crystals, whenever standard, right-hand-thread bolts or nuts are being tightened.

To complete this transducer arrangement, the space between the heads 46 of the rotor, and the capacitor shell 32 about the rotor is filled with a synthetic plastic resin 54, such as a polyethylene, to hold the components in place and to serve as an insulator between the rotor and the capacitor shell about it.

As set forth at FIG. 6, the electrical circuit for this torque indicator is comparatively simple. A nominal ground lead will be through the body of the rotor and extends through the bearing races and through the housing 21. The other circuit lead will extend from the shims 52 between the piezo-electric crystals 51 of the crystal sets 50, thence through the rotary capacitor "C", thence to a signal amplifier indicated as a block 55 in FIG. 6. Thence the circuit extends to a readout apparatus indicated as a block 56 in FIG. 6. An amplifier circuit to enhance the voltage signal produced by the piezo-electric crystal sets 50 is essentially conventional and need not be described. Likewise, the readout apparatus to indicate torque on a meter or as a digital readout is conventional and apparently need not be further described.

FIGS. 8 – 11 illustrate a simplified mode of manufacture of the rotor 20 with respect to attaching the arms 53. The rotor is formed to provide the head 22, the stub 24, the bearing seats 30, the heads 46 and the flexure column 45 as heretofore described. Each arm 53 is made of a short T-bar 60. The arms of the T-bars 60 form a base portion 61 and the leg of the T-bar 60 forms the arm 53. Flat faces 62 are milled into the heads and bearing seats 30 of the rotor to receive the base portion 61 of the T-bars 60 at their proper position as illustrated. These base portions 61 are welded into place as shown at 63. Thereafter, the rotor is turned or ground to render the bearing seats 30 and 31 and the heads 46 as unitarily cylindrical as in FIG. 9. The piezo-electric crystal sets 50 and the shell 32 are then installed and the unit is thereafter completed by filling the cavity within the confines of the shell 32 with plastic 54 as indicated in FIG. 10. It is to be noted that the arms are set alongside, but are spaced a short distance from the flexure column 45 to provide for a clearance 64 from the sides of the column as best shown at FIG. 11.

While a selected form of the invention has been above described, it is understood that mechanical variations and detail substitutions can be made by one skilled in the art without departing from the spirit of the invention.

Having thus described the invention what is claimed and desired to be secured by Letters Patent is:

1. A dynamic torque indicator for securing a driver means with a driven means, comprising:
   a. an axially extended rotor having a first connecting means at one extremity to connect with the driver means, a second connecting means at the opposite extremity to connect with the driven means and a flexure column between the first connecting means and the second connecting means adapted to be torsionally flexed responsive to torque applied between said first and second connecting means;

b. a housing having a passageway therethrough wherein said rotor is freely rotatably mounted;

c. transducer means positioned on said rotor adjacent said flexure column, and between said first and second connecting means, said transducer means being adapted to convert torsional flexions of said flexure column into electrical signals; and d. circuit readout means connected to and actuated by said transducer means for producing indications responsive to said electrical signals, wherein the circuit readout means includes a rotary capacitor having an inner cylindrical shell axially centered upon the rotor and an outer cylindrical shell axially centered in the axial passageway of the housing and embracing the inner shell.

2. In the torque indicator defined in claim 1, wherein the rotor is mounted upon a bearing means at each side of the flexure column to hold the rotor in axial alignment with the axial passageway of the housing, and wherein said rotary capacitor inner cylindrical shell is axially centered upon the rotor between the bearing means.

3. In the torque indicator defined in claim 2, wherein the rotor includes:

a. a head at each end of the flexure column;

b. an arm extends from each head to lie alongside the flexure column and alongside and in spaced parallelism with an opposing arm extending from the other head; and c. wherein the transducer means is disposed between the arms, whereby the flexure column, when subjected to torque, moves the arms together and apart to vary the pressure of the arms against the transducer.

4. In the torque indicator defined in claim 3, wherein:

a. the arms and the transducer means lie in a pocket between each head and within the inner shell of the rotary capacitor;

b. a lead connecting said transducer means with said inner shell; and c. an insulating, dielectric embedment means filling the space between the heads and the inner cylindrical shell of the rotary capacitor and supporting the inner shell.

5. In the torque indicator defined in claim 2, wherein:

a. a cylindrical bearing seat is provided at each side of the flexure column; and b. bearing races are mounted upon the bearing seats and within the housing.

6. In the torque indicator defined in claim 5, wherein:

a. the passageway through the housing is cylindrical with a bearing race at each end of the passageway; and b. wherein the said outer capacitor shell is mounted upon dielectric spacer rings between the bearing races and axially concentric with the rotor and the aforesaid inner cylindrical capacitor shell.

7. In the torque indicator defined in claim 5, wherein:

a. a cylindrical head is formed at the central portion of the rotor adjacent to each bearing seat;

b. an arm extends from the inner face of each cylindrical head to lie alongside and substantially parallel to the flexure column and alongside and in spaced parallelism with a corresponding arm on the other head; and c. wherein said transducer means is a piezo-electric crystal means fitted between the spaced arms.

8. In the torque indicator defined in claim 1, wherein an arm is mounted on the rotor at each end of the flexure column, each arm being extended to lie alongside the flexure column and alongside the other arm at the opposite end of the flexure column, with said transducer means lying between the two arms, and comprising:

a. a pair of oppositely oriented, silica wafers and a metallic shim between the wafers, said shim extending to and connecting with the aforesaid inner shell of the rotary capacitor.

* * * * *